Oct. 30, 1923.

F. B. RAE

IRONING AND STEAMING DEVICE

Filed Aug. 13, 1920      2 Sheets-Sheet 1

1,472,089

INVENTOR
FRANK B. RAE.

Fisher & Ulbert
ATTORNEYS

Oct. 30, 1923.
F. B. RAE
1,472,089
IRONING AND STEAMING DEVICE
Filed Aug. 13, 1920    2 Sheets-Sheet 2
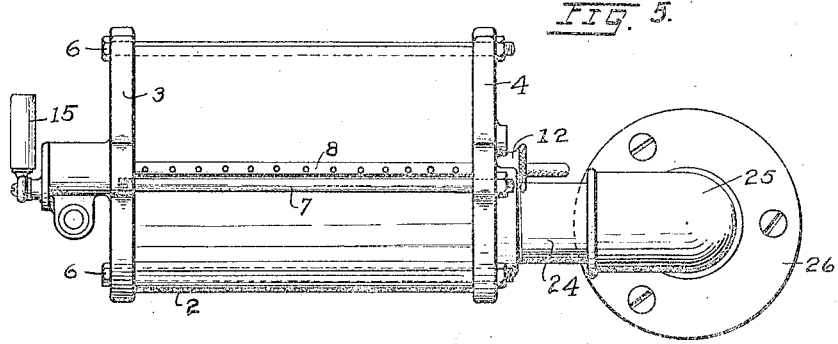
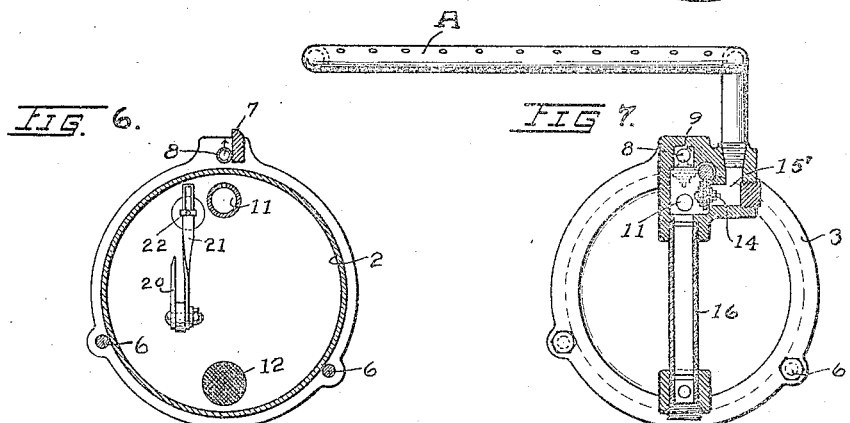
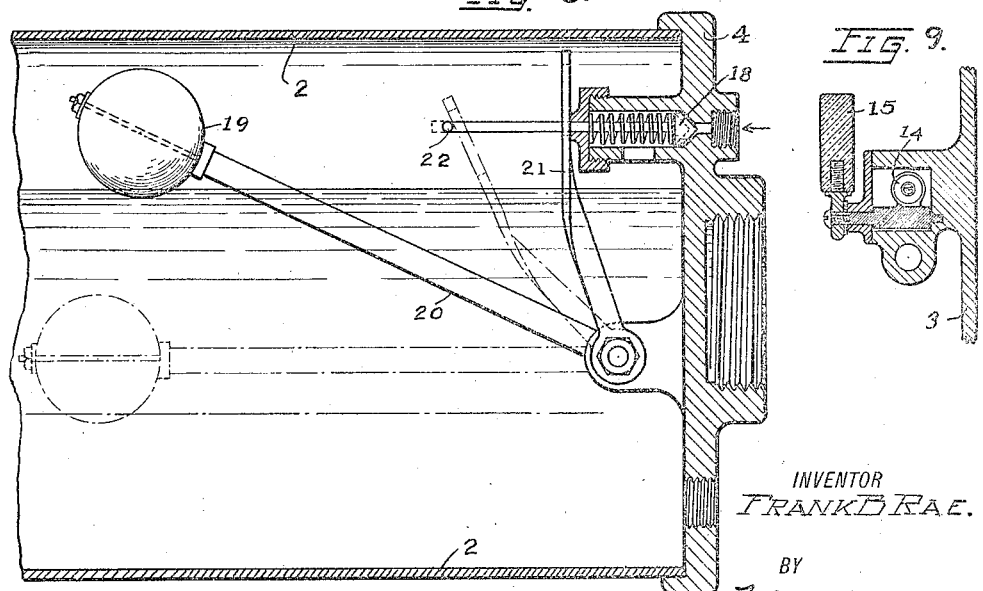
INVENTOR
FRANK B RAE.
BY
ATTORNEYS Patented Oct. 30, 1923.

1,472,089

UNITED STATES PATENT OFFICE.

FRANK B. RAE, OF CLEVELAND, OHIO, ASSIGNOR TO FRIEDERICH J. LANGER, OF CLEVELAND, OHIO.

IRONING AND STEAMING DEVICE.

Application filed August 13, 1920. Serial No. 403,179.

*To all whom it may concern:*

Be it known that I, FRANK B. RAE, a citizen of the United States, residing at Cleveland, in the county of Cuyahoga and State of Ohio, have invented certain new and useful Improvements in an Ironing and Steaming Device, of which the following is a specification.

My object is to provide a steaming and ironing device for milliners, haberdashers, tailors and others, and as constructed the device is adapted to be secured in a stationary elevated or suspended position upon a bench or other support where goods of any length may be drawn across the same. The device comprises a cylinder containing an electrical heating unit for generating steam and the steam is directed against the goods coincidently with the ironing and smoothing operation. The device also embodies means for automatically maintaining a liquid level within the heating cylinder, and also means adapted to safe-guard operators.

Figure 1:
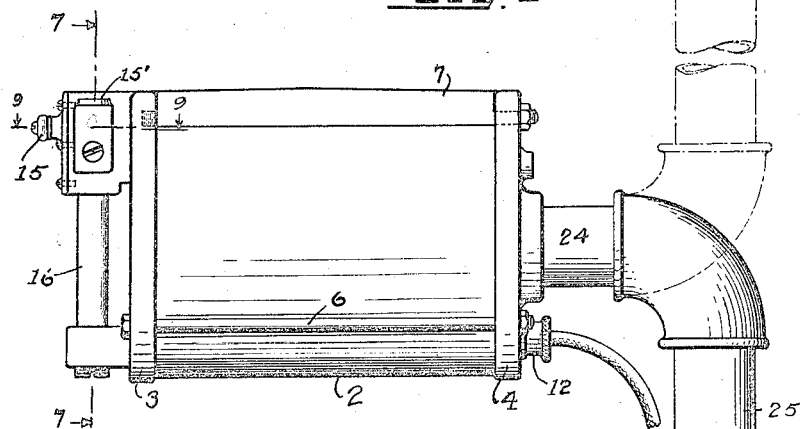
Figure 2:
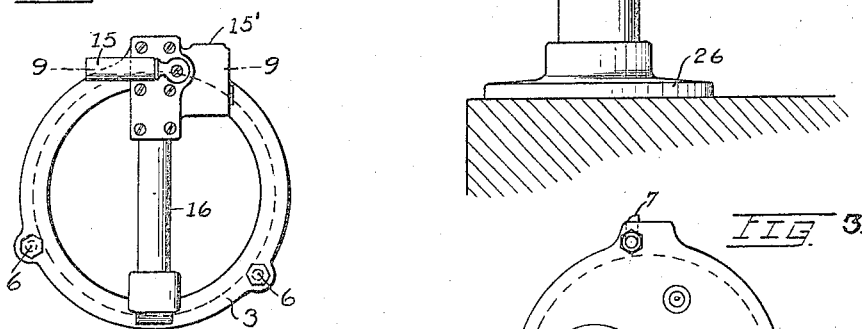
Figure 3:
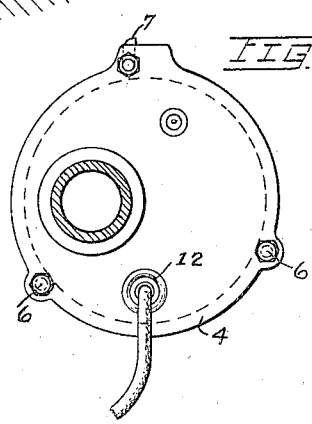
Figure 4:
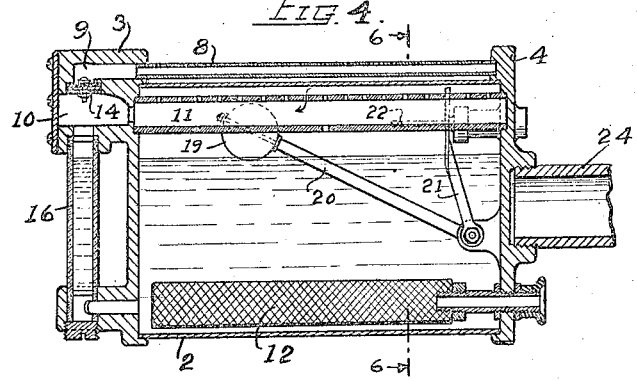

In the accompanying drawings, Fig. 1 is a side elevation of the device mounted upon a suitable support, and the dotted lines in this figure disclose a mode of suspending the device from a table or other support. Figs. 2 and 3 are views of the opposite ends of the device. Fig. 4 is a vertical section longitudinally through the center of the device. Fig. 5 is a plan view and Figs. 6 and 7 are cross sections on lines 6—6, Fig. 4, and lines 7—7, Fig. 1, respectively. Fig. 8 is an enlarged sectional view showing a float control relief valve. Fig. 9 is a horizontal section, enlarged, on line 9—9, Fig. 2.

The invention comprises a hollow cylinder 2 which is closed at its opposite ends by separate removable heads 3 and 4, respectively, held in place by a pair of tie-rods 6 and an ironing bar or blade 7. A relatively small perforated escape tube 8 extends between said heads at one side and beneath the upper edge of blade 7, and one end of this perforated tube is open to a duct 9 and chamber 10 in front head 3. A perforated pipe 11 also extends between said heads within cylinders 2, in discharge communication with chamber 10, see Fig. 4, and an electrical heating unit 12 is situated within the bottom of the cylinder to heat the water therein and to generate steam. A valve 14 having a handle 15 is mounted at the front of head 3 to control the outflow of steam from inner pipe 11 to escape tube 8, and this valve also controls the outflow of steam through a by-pass 15' at one side of chamber 10, see Fig. 7. When said valve is given a quarter turn downwardly the by-pass 15' is closed and duct 9 is open, and when the valve is raised duct 9 is closed and the by-pass 15' is open. Any suitable tube or supplemental attachment may be connected with the outer end of by-pass 15' to utilize the steam issuing therefrom. A vertical tube 16 preferably of glass or other transparent material is secured at the front side of the head to establish open communication and a return passage between chamber 10 and the bottom side of cylinder 2, and the level of the liquid within the cylinder can be observed through this sight tube. This vertical tube also serves to return to the boiler the water which collects within pipe 11 and the primary function of pipe 11 is to prevent water from collecting and gathering in any quantity and from discharging through the escape tube 8 with the steam.

A spring-pressed valve 18 is also provided at the inner side of the rear wall or head 4, and a float 19 affixed to a pivoted arm 20 is adapted to operate an arm 21 which will open valve 18 when said arm moves inwardly and engages a projection or enlargement 22 at the inner end of the stem of said valve. This movement occurs when the water level and the float drop and an additional supply of water is required to restore the level of the liquid within the cylinder or boiler 2. The rear head 4 is provided with a central screw-threaded boss which is adapted to receive a pipe or nipple 24 forming part of a supporting standard 25 having a base flange 26 adapted to be secured to a table or other support.

In operation and assuming that steam has been generated with sufficient volume within the cylinder or boiler the steam will pass downwardly through the perforations in the upper side of inner pipe 11 and thence through chamber 10 and duct 9 into escape tube 8 where the steam will issue in fine jets through the perforations or openings in the upper side of tube 8. The goods to be steamed and ironed is then drawn across the rounded ironing edge of blade 7 and if an additional ironing effect is desired the goods may also be drawn over the rounded sides of cylinder 2. When ironing without steam is desired the goods may be passed cross the rounded surface of cylinder 2 beneath escape tube 8 and bar 7. In Fig. 7 I show a steaming and ironing attachment A connected with the tapered outlet of by-pass 15' and this attachment may be rotated and placed at any desired working position relatively to the cylinder.

What I claim is:

1. An ironing and steaming device, comprising a boiler having a heating element therein and a tube mounted outside and openly connected with the interior of said boiler having steam escape openings at intervals lengthwise thereof, and an ironing bar extending parallelly with and closely adjacent said tube and the wall of said boiler.

2. An ironing and steaming device comprising a boiler having an electrical heating unit therein, a steaming tube and an ironing blade mounted parallelly in close relation to each other above and relatively near said boiler, and said tube having open communication with the interior of said boiler.

3. An ironing and steaming device comprising a boiler and heating means within the same, a steam tube and an ironing element mounted closely adjacent each other and the side of said boiler, and a steam supply tube for said steaming tube situated within the upper portion of the boiler.

4. An ironing and steaming device comprising a boiler having a perforated steam discharge pipe within its upper side and provided with a perforated steaming tube upon the outside of said boiler communicating with said inner pipe and an ironing element located at the side of said tube.

5. An ironing and steaming device comprising a boiler having an ironing element affixed thereon and a tube with steam escape openings adjacent said ironing element, and a by-pass connection and a valve therewith to control the outflow of steam from said boiler to said tube.

6. An ironing and steaming device comprising a boiler and a perforated tube arranged within its interior and an another perforated tube in communication therewith on its exterior, a steam controlling valve between said tubes and an ironing element lying closely adjacent and parallelling said exterior tube.

7. An ironing and steaming device comprising a boiler having a perforated steam discharge pipe within its steam space, a perforated steam escape tube upon its outside and an ironing element exposed to the steam escaping from said tube and both said pipe and tube in open communication with each other and with a liquid return passage extending into the bottom side of said boiler.

8. An ironing and steaming device comprising an upright support and a boiler mounted in a horizontal and overhanging position in respect thereto, and an ironing element and steam escape openings longitudinally of the exterior of said boiler.

Signed at Cleveland, in the county of Cuyahoga and State of Ohio, this 20th day of July, 1920.

FRANK B. RAE.